Figure 1:
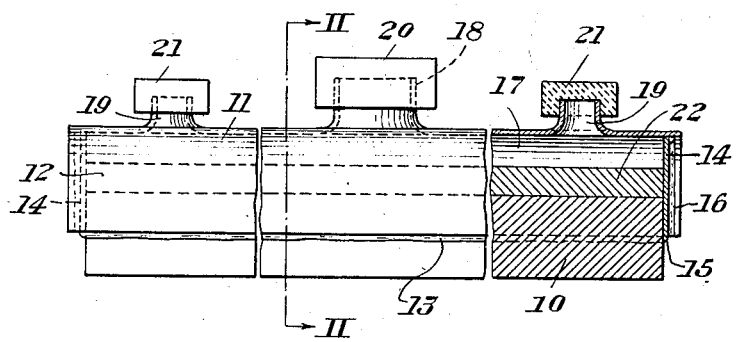

March 7, 1944.

C. W. HOLMQUIST 2,343,771

METHOD OF MAKING COMPOSITE BILLETS

Filed Nov. 10, 1941

INVENTOR
Carl W. Holmquist
by his attorneys
Stebbins and Blenko

Patented Mar. 7, 1944

2,343,771

UNITED STATES PATENT OFFICE 2,343,771

METHOD OF MAKING COMPOSITE BILLETS

Carl W. Holmquist, Glassport, Pa., assignor to Copperweld Steel Company, Glassport, Pa., a corporation of Pennsylvania Application November 10, 1941, Serial No. 418,504

3 Claims. (Cl. 22—203)

This invention relates to a method of making composite billets and, particularly, billets suited for the manufacture of sheets composed of base metal with a cladding layer of a different metal thereon.

Numerous methods have been suggested heretofore for the production of composite billets suited for rolling into clad metal sheets but none of them, so far as I am aware, has proved entirely satisfactory in actual operations. It is the object of my invention to improve upon methods of this character as known heretofore and to provide a procedure which can readily be carried out with equipment and material ordinarily available.

In a preferred practice of my invention, I attach a mold chamber temporarily to a billet of base metal effective to exclude the atmosphere therefrom and pour a layer of cladding metal into the mold chamber and onto the base metal. Thereafter, I remove the mold chamber or, at least, the portion thereof above the top of the layer of cladding metal and subject the resulting composite billet to rolling, thereby reducing it to sheet form. More specifically, I attach metal mold walls to the sides and end of a billet of base metal, as by welding and pour the cladding metal therein to weld it to the base metal.

Figure 2:
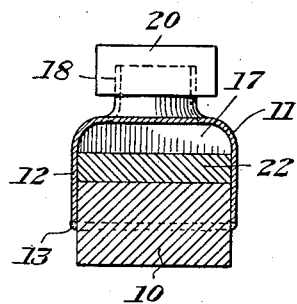
Figure 3:
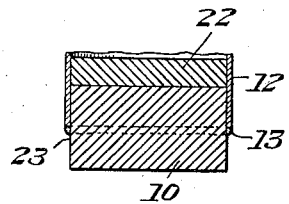

The invention may be more fully understood from the following detailed description and explanation which refer to the accompanying drawing illustrating the several steps of the preferred practice. In the drawing, Figure 1 is a side elevation with a portion in longitudinal section, showing a mold chamber built up on a billet of base metal and having a layer of cladding metal poured therein;

Figure 2 is a transverse sectional view taken along the plane of line II—II of Figure 1; and Figure 3 is a view similar to Figure 2 showing the composite billet ready for rolling after the removal of the mold chamber.

Referring now in detail to the drawing, to produce a composite billet by my invention, I provide a billet 10 of base metal such as steel and build up thereon a mold chamber 11 adapted to exclude the atmosphere from contact with the billet. This may conveniently be done by welding to the sides of the billet 10 the edges of a bent plate 12, as indicated at 13 and by welding end plates 14 to the ends of the billet as at 15 and to the plate 12 as at 16. The plate 12 forms the body of a mold chamber 17 above the upper surface of the billet 10. The plate 12 is preferably provided with an upcast pouring spout 18 and vent openings 19. Covers 20 and 21 for the spout and vent openings are preferably composed of refractory material such as a clay-graphite material.

After the mold chamber 17 has been built up on the billet 10 by welding on plates 12 and 14, as above described, I pour a layer 22 of cladding metal, e. g., of copper or an alloy thereof, into the chamber 17 and onto the upper surface of the billet 10. The cladding metal when heated to a temperature at which it is entirely molten, is poured through the spout 18 after removing the covers 20 and 21. The molten cladding metal, as it is poured, builds up a layer of substantial thickness upon the billet 10 and becomes firmly welded thereto. When the desired amount of cladding metal has been poured, the covers 20 and 21 are replaced and the layer 22 is permitted to cool below the temperature at which it solidifies.

When the layer of cladding metal 22 has solidified and formed a firm bond with the billet 10, I remove the mold chamber 17, to prepare the resulting composite billet for rolling into sheet form. Preferably, the walls of the mold chamber are severed as by an oxy-acetylene flame at about the level of the top of the layer 22. The appearance of the composite billet after removal of the mold chamber is illustrated in Figure 3. The composite billet, designated 23, is then ready for reduction by repeated passes through a suitable hot mill, after being heated to appropriate rolling temperature. As the rolling proceeds, the portions of the mold walls initially left on the sides and ends of the composite billet are detached, leaving only the metal of the base billet 10 and cladding layer 22 to be reduced to sheet form. When the billet 23 is properly rolled, there results a highly satisfactory composite sheet product which has utility in many different applications. The cladding layer is found to be firmly adherent to the base metal throughout the area thereof, even though the thickness of the final product is only a small fraction of the initial thickness of the composite billet. In other words, the rolling merely thins the base metal and cladding layer without impairing the bond therebetween formed initially when the molten cladding metal is poured onto the base billet within the mold chamber temporarily attached thereto.

It will be apparent from the foregoing description that the invention provides a novel and highly useful method of producing composite billets for the manufacture of clad metal sheets. The mold chamber excludes the atmosphere from the billet during heating thereof prior to pouring and also during cooling of the cladding layer.

The use of the invention requires only the attachment of the mold chamber and since this is composed of simple forms of metal plate, the cost thereof is not very great. A rough welding is sufficient for the attachment of the mold walls since they are eventually removed anyhow and all that is required is a temporary attachment to the base billet. The invention is applicable to the cladding of various kinds of base metal with a wide variety of cladding metals and the examples mentioned hereinabove are merely typical. As previously pointed out, the invention may be practiced without elaborate equipment or preparations since the materials and the equipment involved are those usually available in steel plants or the like.

Although I have illustrated and described only a preferred practice of the invention, it will be understood that changes in the procedure disclosed may be made without departing from the spirit of the invention or the scope of the appended claims.

I claim:

1. In a method of forming a composite billet suitable for rolling into sheets composed of base metal with a cladding layer of a different metal thereon, the steps including attaching to a billet of base metal an air-excluding mold chamber having a pouring opening with a removable closure, removing said closure, pouring a layer of cladding metal through said opening into said chamber and onto said base-metal billet, replacing said closure and when the layer has solidified, removing at least the portion of the mold chamber above the level of the upper surface of the layer.

2. In a method of forming a composite billet suitable for rolling into sheets composed of base metal with a cladding layer of a different metal thereon, the steps including applying to the sides and ends of a billet of base metal an air-excluding mold chamber enclosing one face of the billet and having a pouring opening to receive cladding metal with a removable closure, removing said closure, pouring a layer of cladding metal through said opening into said chamber, replacing said closure and after solidification of said layer removing the part of the chamber above the layer.

3. In the method of forming a composite billet suitable for rolling into sheets composed of a ferrous base with a cladding layer thereon, the steps including providing an air-excluding mold chamber fully enclosing the upper face of a ferrous billet and having a pouring opening with a removable closure, removing said closure, pouring a layer of cladding metal through said opening into said chamber, replacing said closure, and removing the portion of the chamber above said layer after solidification of the latter.

CARL W. HOLMQUIST.